United States Patent
Al-Hassan et al.

(10) Patent No.: US 11,838,045 B2
(45) Date of Patent: Dec. 5, 2023

(54) SYSTEM AND METHOD FOR CONTROLLING AN ANTENNA SYSTEM

(71) Applicant: SAUDI ARABIAN OIL COMPANY, Dhahran (SA)

(72) Inventors: Abdullah Y. Al-Hassan, Al-Jafr (SA); Khalid D. Al-Mahasheer, Ras Tanura (SA); Rami A. Al-Ghanim, Dhahran (SA); Abdulaziz K. Al-Abdullatef, Khobar (SA); Firas A. Al-Kaud, Riyadh (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 254 days.

(21) Appl. No.: 17/486,486

(22) Filed: Sep. 27, 2021

(65) Prior Publication Data
US 2023/0113117 A1    Apr. 13, 2023

(51) Int. Cl.
*H04B 1/44* (2006.01)
*H04B 17/17* (2015.01)
*G08B 21/18* (2006.01)

(52) U.S. Cl.
CPC ............ *H04B 1/44* (2013.01); *G08B 21/18* (2013.01); *H04B 17/17* (2015.01)

(58) Field of Classification Search
CPC ........... H04B 1/44; H04B 17/17; G08B 21/18
See application file for complete search history.

(56) References Cited

U.S. PATENT DOCUMENTS

| | | | | |
|---|---|---|---|---|
| 6,091,970 A | * | 7/2000 | Dean | H04W 88/08 455/562.1 |
| 6,625,741 B1 | * | 9/2003 | Post | G07B 17/00733 365/228 |
| 7,039,370 B2 | * | 5/2006 | Laroia | H01Q 3/24 375/267 |
| 7,173,561 B2 | * | 2/2007 | Isaji | H04B 7/0604 342/107 |
| 8,666,450 B2 | | 3/2014 | Huang et al. | |
| 11,025,311 B1 | * | 6/2021 | Rios | H04B 7/0413 |
| 11,515,993 B1 | * | 11/2022 | Reda | H01Q 1/525 |
| 2003/0073463 A1 | * | 4/2003 | Shapira | H04B 1/40 455/562.1 |
| 2003/0197637 A1 | * | 10/2003 | Lalezari | H01Q 3/2611 342/423 |

(Continued)

*Primary Examiner* — Dominic E Rego
(74) *Attorney, Agent, or Firm* — Osha Bergman Watanabe & Burton LLP

(57) ABSTRACT

A system includes: a TX port and a RX port; an omnidirectional TX antenna connected to the TX port; a plurality of RX antennas connected to the RX port, wherein each RX antenna comprises a first antenna element and a second antenna element; a monitoring circuit connected to the TX antenna; a switching circuit connected to the second antenna element of each RX antenna; and a processor connected to the monitoring circuit and to the switching circuit. The monitoring circuit monitors a status of the TX antenna. In response to a failure of the TX antenna detected by the monitoring circuit: the monitoring circuit notifies the processor of the failure; and the processor controls the switching circuit to switch the second antenna element of each RX antenna to be connected to the TX port. When the failure is not detected, the second antenna element of each RX antenna is disconnected from the TX port.

10 Claims, 3 Drawing Sheets

(56) References Cited

U.S. PATENT DOCUMENTS

| | | | |
|---|---|---|---|
| 2006/0194615 A1* | 8/2006 | Vallapureddy | A61N 1/37252 455/562.1 |
| 2010/0008455 A1* | 1/2010 | Willgert | H04B 7/10 375/346 |
| 2010/0222012 A1* | 9/2010 | Shibuya | H04B 17/336 455/79 |
| 2011/0032854 A1* | 2/2011 | Carney | H04B 1/401 370/294 |
| 2012/0235859 A1* | 9/2012 | Hayase | G01S 7/4008 342/189 |
| 2013/0294301 A1* | 11/2013 | Bitton | H04B 7/0691 455/553.1 |
| 2015/0382307 A1* | 12/2015 | Harper | H04B 17/103 455/127.1 |
| 2016/0087339 A1* | 3/2016 | Bull | H04W 16/28 342/367 |
| 2016/0226620 A1* | 8/2016 | Zinser | H04K 3/228 |
| 2016/0337021 A1* | 11/2016 | Sung | H04W 16/28 |
| 2017/0201859 A1* | 7/2017 | Banerjea | H04B 7/086 |
| 2017/0244176 A1* | 8/2017 | Ming | H01Q 1/246 |
| 2018/0024236 A1* | 1/2018 | Zorea | G08G 5/006 342/30 |
| 2018/0031689 A1* | 2/2018 | Ben-Ari | H01Q 13/04 |
| 2018/0074173 A1* | 3/2018 | Trotta | G01S 7/003 |
| 2018/0159233 A1* | 6/2018 | Kummetz | H01Q 3/26 |
| 2018/0205435 A1* | 7/2018 | Nair | H04B 7/0615 |
| 2018/0312020 A1* | 11/2018 | Saburi | B60C 23/0464 |
| 2019/0208366 A1* | 7/2019 | Sosnin | G01S 13/876 |
| 2019/0335511 A1 | 10/2019 | Liu | |
| 2020/0280347 A1* | 9/2020 | Rios | H04B 7/0417 |
| 2021/0036837 A1* | 2/2021 | Huang | H04L 5/0023 |
| 2022/0069449 A1* | 3/2022 | Xue | H01Q 21/205 |
| 2022/0069876 A1* | 3/2022 | Xue | H04B 7/0617 |
| 2022/0148446 A1* | 5/2022 | Brandao | G08G 5/0052 |

\* cited by examiner

SYSTEM AND METHOD FOR CONTROLLING AN ANTENNA SYSTEM

BACKGROUND

TErrestrial Trunked RAdio (TETRA) technology is widely used to support wireless communication in many areas such as energy, transportation, utilities, military, and public safety. These applications usually require the communication to meet certain standards with respect to speed, quality, reliability, number of users, data security, geographic coverage, and ability for direct operation in the absence of a network.

The base station is an essential component of the TETRA network. The base station is the local wireless network hub and the gateway between wired and wireless networks. The antennas of the base station are commonly set up to have an omnidirectional transmission (TX) antenna and multiple panels of receiving (RX) antennas. The RX antennas are placed in a way to receive from all directions) (360°). Conventionally, the TX antenna has no backup. If the TX antenna, for any reason, goes down, the base station will lose the capability of transmitting the radio signals, thereby putting the normal operation and the safety at risk.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to a system for controlling an antenna system. The system includes: a TX port and a RX port; an omnidirectional TX antenna connected to the TX port; a plurality of RX antennas connected to the RX port, wherein each RX antenna comprises a first antenna element and a second antenna element; a monitoring circuit connected to the TX antenna; a switching circuit connected to the second antenna element of each RX antenna; and a processor connected to the monitoring circuit and to the switching circuit. The monitoring circuit monitors a status of the TX antenna. In response to a failure of the TX antenna detected by the monitoring circuit: the monitoring circuit notifies the processor of the failure; and the processor controls the switching circuit to switch the second antenna element of each RX antenna to be connected to the TX port. When the failure is not detected, the second antenna element of each RX antenna is disconnected from the TX port.

In one aspect, embodiments disclosed herein relate to a method for controlling an antenna system. The method includes: connecting an omnidirectional TX antenna to a TX port; connecting a plurality of RX antennas to a RX port, wherein each RX antenna comprises a first antenna element and a second antenna element; monitoring a status of the TX antenna. The method further includes: in response to detecting a failure of the TX antenna, notifying the failure and switching the second antenna element of each RX antenna to be connected to the TX port. When the failure is not detected, the method includes disconnecting the second antenna element of each RX antenna from the TX port.

Other aspects and advantages of the claimed subject matter will be apparent from the following description and the appended claims.

DETAILED DESCRIPTION

Figure 1:
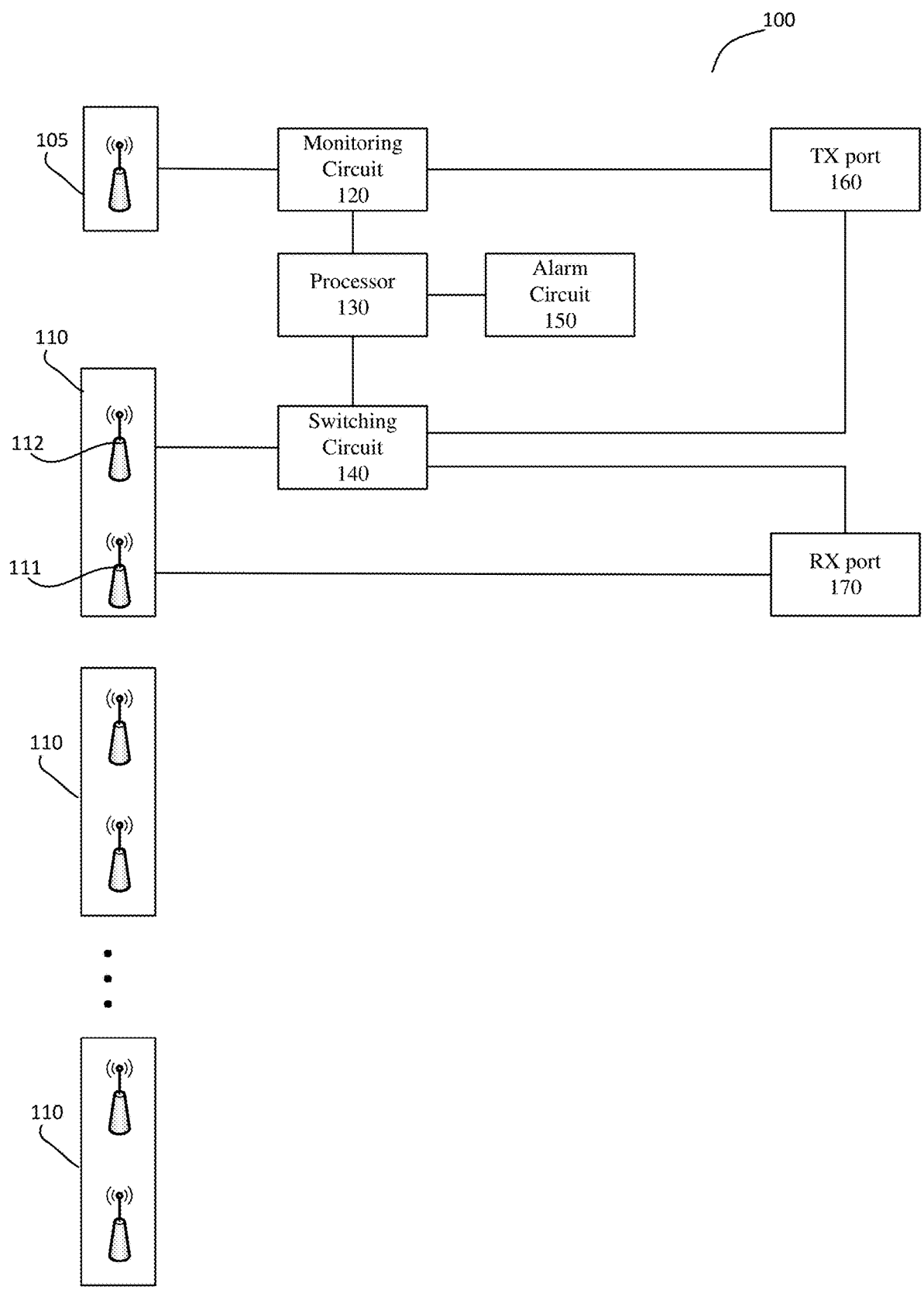
FIG. 1 is a block diagram of a system according to one or more embodiments.

Specific embodiments of the invention will now be described in detail with reference to the accompanying figures. Like elements in the various figures are denoted by like reference numerals for consistency. Like elements may not be labeled in all figures for the sake of simplicity.

In the following detailed description of embodiments, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers does not imply or create a particular ordering of the elements or limit any element to being only a single element unless expressly disclosed, such as by the use of the terms "before," "after," "single," and other such terminology. Rather, the use of ordinal numbers is to distinguish between the elements. By way of an example, a first element is distinct from a second element, and the first element may encompass more than one element and succeed (or precede) the second element in an ordering of elements.

In the following description of FIGS. 1-4, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment which may be implemented in addition to, in conjunction with, or in place of the embodiments described with regard to a corresponding like-named component in any other figure.

It is to be understood that the singular forms "a," "an," and "the" include plural referents unless the context clearly dictates otherwise. Thus, for example, reference to "a horizontal beam" includes reference to one or more of such beams.

Terms such as "approximately," "substantially," etc., mean that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

It is to be understood that, one or more of the steps shown in the flowcharts may be omitted, repeated, and/or performed in a different order than the order shown. Accordingly, the scope of the invention should not be considered limited to the specific arrangement of steps shown in the flowcharts.

Although multiple dependent claims are not introduced, it would be apparent to one of ordinary skill that the subject matter of the dependent claims of one or more embodiments may be combined with other dependent claims.

FIG. 1 is a block diagram of a system 100 according to one or more embodiments. The system 100 includes a TX antenna 105 and a plurality of RX antennas 110. While FIG. 1 shows only 3 RX antennas 110, other embodiments may have more or fewer RX antennas.

The TX antenna 105 may be omnidirectional. That is, the radiation pattern of the TX antenna 105 may be substantially uniform in a 360° space about the antenna's axis. When the TX antenna 105 has a vertical axis, the radiation pattern is substantially uniform in all horizontal directions with very little power wasted in radiation towards the sky or the ground. This omni-directionality makes it possible for the system 100 to broadcast information to a wide range of potential receivers. Many choices of omnidirectional antennas are available in conventional technologies. They are not listed here for the sake of brevity.

The TX antenna 105 is electronically connected to a TX port 160, through which information to be transmitted is fed to the TX antenna 105. The TX port 160 may be part of a base station, a network node, or other forms of communication equipment, such as a device used in a TETRA network.

Each RX antenna 110 may be in the form of a panel and may or may not be omnidirectional. These RX antennas 110 are dual-function antennas. That is, each RX antenna 110 has the capability to operate as both a TX antenna and an RX antenna. Specifically, in one or more embodiments, each RX antenna 110 includes a first antenna element 111 and a second antenna element 112. While both antenna elements 111 and 112 are normally connected to an RX port 170, through which received information is transported and then processed, the second antenna element 112 may be switched to be connected to the TX port 160 in the event of a failure of the TX antenna 105. In such an event, the second antenna element 112 functions as a TX antenna while the first antenna element 111 continues to function as an RX antenna.

Similar to the TX port 160, the RX port 170 may be part of a base station, a network node, or other forms of communication equipment, such as a device used in a TETRA network.

The system 100 further includes a monitoring circuit 120 that is connected to the TX antenna 105 and monitors the status of the TX antenna 105, a processor 130 that is connected to the monitoring circuit 120 and a switching circuit 140 and controls the switching circuit 140 to switch the second antenna element 112 between RX and TX functions, and, optionally, an alarm circuit 150 that receives a signal from the processor and sends an alarm when the failure of the TX antenna 105 is detected. The failure may be caused by various reasons such as outdated antenna components, loose connections, and discontinuity due to lightning strikes.

Figure 2:
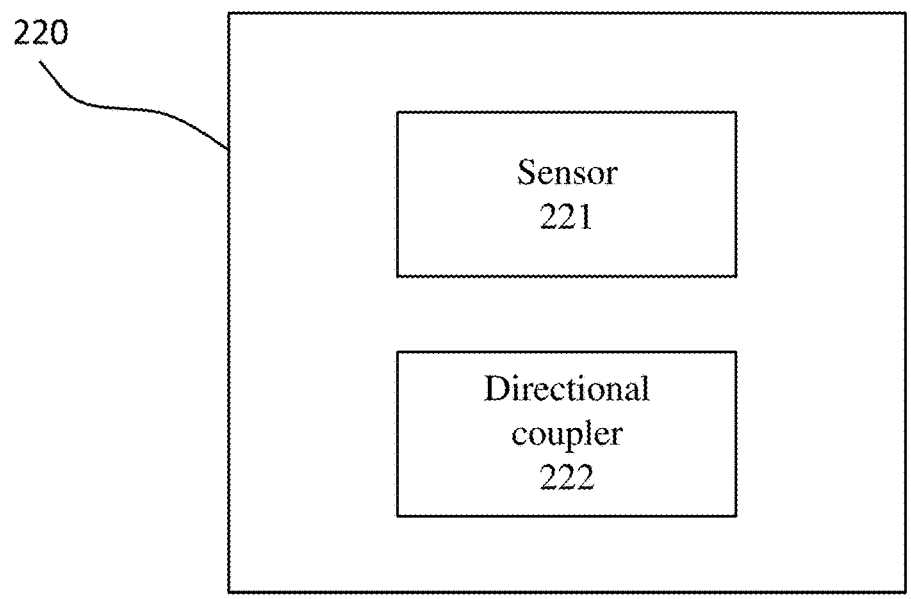
FIG. 2 is a block diagram of a monitoring circuit according to one or more embodiments.

FIG. 2 is a block diagram of a monitoring circuit 220 according to one or more embodiments. As illustrated in FIG. 2, the monitoring circuit 220 includes a sensor 221 and a directional coupler 222. The sensor 221 may be a power sensor. Together with the directional coupler 222, the sensor 221 monitors a forward power and a reverse power of the TX antenna. When the monitoring circuit 220 detects a failure of the TX antenna, the processor in the system is notified.

As mentioned above, in the event of a failure of the TX antenna, the processor controls the switching circuit to switch the second antenna element of each RX antenna to be connected to the TX port. In one or more embodiments, the switching circuit includes a splitter whose structure is illustrated in FIG. 3.

Figure 3:
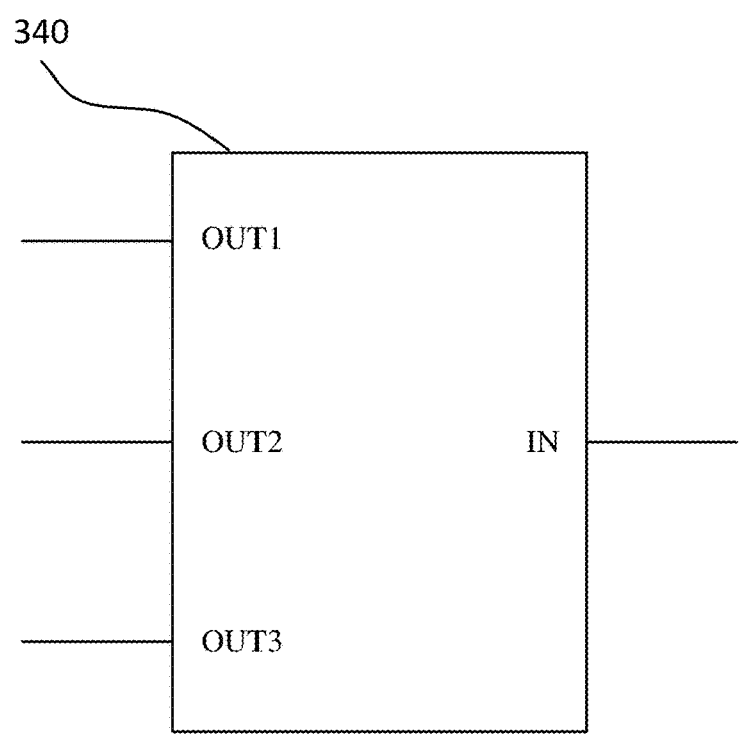
FIG. 3 is a diagram that illustrates the structure of a splitter according to one or more embodiments.

As shown in FIG. 3, the splitter 340 includes an input port IN and three output ports OUT1-OUT3. This structure makes the splitter 340 a 3-way splitter, which may be used in an antenna system that has 3 RX antennas. However, as mentioned earlier, the number of RX antennas may be more or less than 3.

Using an antenna system with 3 RX antennas as an example, when a TX antenna failure is detected, the processor may control the switching circuit such that the second antenna elements of the 3 RX antennas are respectively connected the three output ports OUT1-OUT3 of the splitter 340. Meanwhile, the processor may control the switching circuit such that the TX port is connected to the input port of the splitter 340. In this configuration, the second antenna elements of the 3 RX antennas function as a TX antenna.

On the other hand, when no TX antenna failure is detected, the processor may control the switching circuit to disconnect the input port IN of the splitter 340 from the TX port and instead connect the second antenna element of each RX antenna to the RX port. In this configuration, the second antenna elements of the 3 RX antennas continue to function as an RX antenna.

In addition to the splitter 340, the switching circuit in one or more embodiments may include switching components such as transistors, multiplexers, and complementary metal-oxide-semiconductors (CMOS). The structures of these components are known in conventional technologies and are not described in detail for the sake of brevity.

Experiments have been conducted to test the performance of an antenna system according to an embodiment. The antenna system tested was implemented in a TETRA base station in a half-duplex setting, and the readings were taken by a handheld radio device, which measures the strength of signals transmitted by the TETRA base station. The results are shown in Table 1 below.

Table 1

| TETRA base station status | Received Signal Strength Indicator | Remarks |
| --- | --- | --- |
| TX antenna is operating. | −30 dB | The signal is very strong. |
| TX antenna fails; the embodiment is not implemented. | No service | No signal is detected. |
| TX antenna fails; the embodiment is implemented. | −42 dB | The signal is still strong. |
| TX antenna is restored. | −30 dB | The signal is very strong. |

As can be seen from Table 1, the transmitted signal is very strong when the TX antenna operates normally. When the TX antenna fails, no signal can be detected, if the embodiment of the invention is not implemented. If the embodiment is implemented, there is still strong signal being transmitted from the base station, which has switched half of the RX antennas to perform the transmission, despite the failure of the TX antenna. These results show that the embodiment is effective in preventing communication interruption of the TETRA base station in the event of the TX antenna failure.

The above configurations of the system make it possible to continue wireless communication with reduced interruption in the event of a TX antenna failure. In normal operations when no TX antenna failure is detected, all of the antenna elements of RX antennas (i.e., all of the first antenna elements and the second antenna elements) receive radio signals and pass the received signals to the RX port. When a failure happens, the failure is detected by the monitoring circuit, which notifies the processor. The processor then controls the switching circuit to change the function of a half of the antenna elements (i.e., the second antenna elements) to be TX antennas. With such a switch, the first antenna elements continue to receive radio signals and pass them to the RX port, while the signals to be transmitted are now fed from the TX port to the second antenna elements and transmitted wirelessly. Therefore, even though the TX antenna is not working, the antenna system may still be able to receive and transmit signals. At the same time, the processor may send a signal to the alarm circuit, which alerts the operator of the antenna system of the failure so that repair personnel may be timely dispatched. The alert may be a visual or audio signal, an email, or a text message. Embodiments of the invention thus may reduce the interruption caused by the failure and improve the reliability of the system.

Figure 4:
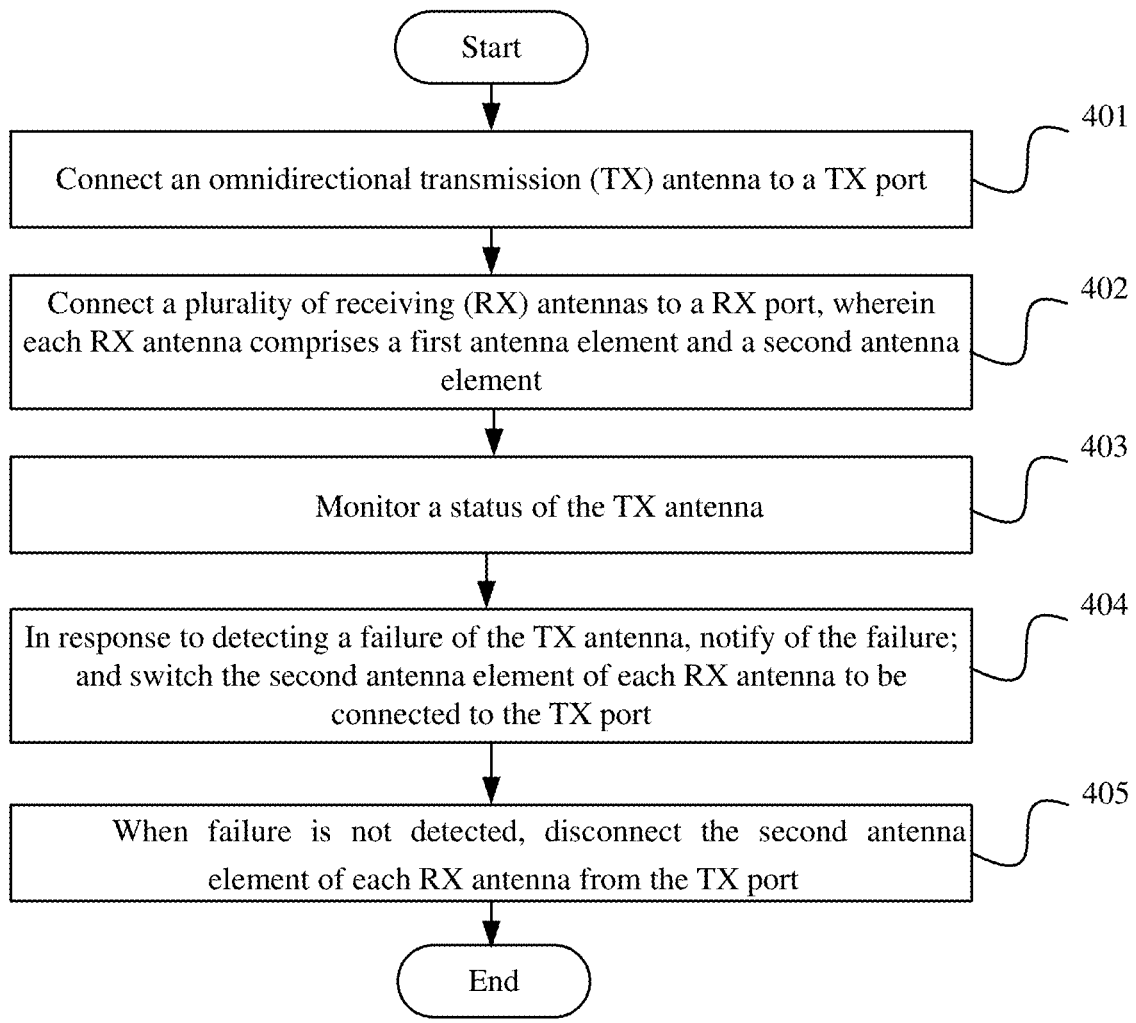
FIG. 4 is a flowchart of a method for controlling an antenna system according to one or more embodiments.

FIG. 4 is a flowchart of a method for controlling an antenna system according to one or more embodiments. In some embodiments, the steps of the method may correspond to the operation and configuration of the antenna system described in reference to FIGS. 1-3.

In step 401, an omnidirectional TX antenna is connected to a TX port.

In step 402, a plurality of RX antennas are connected to a RX port. Each of the RX antennas include a first antenna element and a second antenna element.

In step 403, the status of the TX antenna is monitored by, e.g., a monitoring circuit.

In step 404, when a failure of the TX antenna is detected, the failure is notified by, e.g., a processor, and the second antenna element of each RX antenna is switched to be connected to the TX port.

In step 405, when the failure of the TX antenna is not detected, the second antenna element of each RX antenna is disconnected from the TX port.

Note that steps 401-405 may or may not be executed in the order as they are described. For example, in some embodiments, step 404 may possibly be executed after step 405. Also, not all steps 404-405 are necessarily required to be executed in an embodiment. For example, in some embodiments, if the TX antenna never fails, then step 404 may never get executed.

From the above description, it can be seen that embodiments of the invention may advantageously allow early detection and repair of a TX antenna failure with no or minimal interruption of service. This feature makes the embodiments capable of being integrated to various systems, such as a Communication Supervisory Alarm System (CSAS), a telephone system, and a Disaster Recovery System (DRS) in many sectors, to report potential issues related to the TX antenna.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A system, comprising:
a transmission (TX) port and a receiving (RX) port,
an omnidirectional transmission (TX) antenna connected to the TX port;
a plurality of receiving (RX) antennas connected to the RX port, wherein each RX antenna comprises a first antenna element and a second antenna element;
a monitoring circuit connected to the TX antenna;
a switching circuit connected to the second antenna element of each RX antenna; and
a processor connected to the monitoring circuit and to the switching circuit,
wherein the monitoring circuit monitors a status of the TX antenna,
wherein, in response to a failure of the TX antenna detected by the monitoring circuit:
the monitoring circuit notifies the processor of the failure; and
the processor controls the switching circuit to switch the second antenna element of each RX antenna to be connected to the TX port, and
wherein, when the failure is not detected, the second antenna element of each RX antenna is disconnected from the TX port.

2. The system according to claim 1,
wherein the monitoring circuit comprises a sensor and a directional coupler, and
wherein the sensor and the directional coupler measure a forward power and a reverse power of the TX antenna.

3. The system according to claim 1, wherein the switching circuit comprises a splitter, wherein the splitter comprises an input port and a plurality of output ports, and wherein, in response to the failure of the TX antenna, the processor controls the switching circuit such that the input port is connected to the TX port and each output port is connected to the second antenna element of each RX antenna.

4. The system according to claim 3, wherein the splitter is a 3-way splitter.

5. The system according to claim 1, further comprising an alarm circuit connected to the processor,
wherein, in response to the failure of the TX antenna, the processor sends a signal to the alarm circuit.

6. A method for controlling an antenna system, comprising:
connecting an omnidirectional transmission (TX) antenna to a TX port;
connecting a plurality of receiving (RX) antennas to a RX port, wherein each RX antenna comprises a first antenna element and a second antenna element;
monitoring a status of the TX antenna;
in response to detecting a failure of the TX antenna:
notifying the failure; and
switching the second antenna element of each RX antenna to be connected to the TX port, and
when the failure is not detected:
disconnecting the second antenna element of each RX antenna from the TX port.

7. The method according to claim 6, wherein the status is monitored by measuring a forward power and a reverse power of the TX antenna using a sensor and a directional coupler.

8. The method according to claim 6, wherein, in response to detecting a failure of the TX antenna, the switching comprises:
connecting the TX port to an input port of a splitter; and connecting the second antenna element of each RX antenna to each output port of the splitter.

9. The method according to claim 8, wherein the splitter is a 3-way splitter.

10. The method according to claim 6, wherein notifying the failure comprises:

sending an alarm signal in response to the failure.

* * * * *